(12) United States Patent
Hayashida et al.

(10) Patent No.: US 10,744,462 B2
(45) Date of Patent: Aug. 18, 2020

(54) SEPARATION MEMBRANE MODULE

(71) Applicant: Toray Industries, Inc., Tokyo (JP)

(72) Inventors: Kenji Hayashida, Otsu (JP); Hiroshi Matsumoto, Otsu (JP); Osamu Nakamatsu, Otsu (JP)

(73) Assignee: TORAY INDUSTRIES, INC., Tokyo (JP)

(*) Notice: Subject to any disclaimer, the term of this patent is extended or adjusted under 35 U.S.C. 154(b) by 0 days.

(21) Appl. No.: 16/303,247

(22) PCT Filed: May 19, 2017

(86) PCT No.: PCT/JP2017/018916
§ 371 (c)(1),
(2) Date: Nov. 20, 2018

(87) PCT Pub. No.: WO2017/204123
PCT Pub. Date: Nov. 30, 2017

(65) Prior Publication Data
US 2019/0201849 A1 Jul. 4, 2019

(30) Foreign Application Priority Data
May 25, 2016 (JP) ................................ 2016-104084

(51) Int. Cl.
*B01D 63/04* (2006.01)

(52) U.S. Cl.
CPC ........... *B01D 63/04* (2013.01); *B01D 63/043* (2013.01); *B01D 2313/12* (2013.01);
(Continued)

(58) Field of Classification Search
CPC .................. B01D 63/04; B01D 63/043; B01D 2201/307; B01D 2313/08;
(Continued)

(56) References Cited

U.S. PATENT DOCUMENTS

| | | | | | |
|---|---|---|---|---|---|
| 4,451,369 | A | * | 5/1984 | Sekino .................. | B01D 53/22 |
| | | | | | 210/321.9 |
| 5,470,469 | A | * | 11/1995 | Eckman ................. | B01D 63/02 |
| | | | | | 210/321.8 |
| 7,172,075 | B1 | * | 2/2007 | ji ........................... | B01D 69/08 |
| | | | | | 210/490 |

FOREIGN PATENT DOCUMENTS

| | | |
|---|---|---|
| JP | 53147682 A | 12/1978 |
| JP | 54122678 A | 9/1979 |

(Continued)

OTHER PUBLICATIONS

International Search Report and Written Opinion for International Application No. PCT/JP2017/018916, dated Aug. 1, 2017—8 pages.

*Primary Examiner* — Pranav N Patel
(74) *Attorney, Agent, or Firm* — RatnerPrestia

(57) ABSTRACT

A separation membrane module comprises a hollow module container, and an element unit which is housed in the module container. The element unit comprises a plurality of connected separation membrane elements each of which includes: a separation membrane for separating components of a substance flowing to the inside of the module container; and membrane bundle securing materials for securing both ends of the separation membrane. In the element unit, a flow channel for discharging the components separated by the separation membranes to the outside of the element unit is formed. Passage members though which the components separated by the separation membranes can pass toward the flow channel for discharging are disposed at connections between the plurality of separation membrane elements such that both end surfaces of each of the passage membranes are respectively in contact with the membrane bundle securing materials of the separation membrane elements adjacent thereto.

5 Claims, 4 Drawing Sheets

(52) U.S. Cl.
CPC ...... *B01D 2313/54* (2013.01); *B01D 2319/04* (2013.01); *Y02A 20/131* (2018.01)

(58) Field of Classification Search
CPC .......... B01D 2313/086; B01D 2313/12; B01D 2313/13; B01D 2313/20; B01D 2313/54; B01D 2319/04; Y02A 20/131
See application file for complete search history.

(56) References Cited

FOREIGN PATENT DOCUMENTS

| | | | |
|---|---|---|---|
| JP | 644204 | A | 1/1989 |
| JP | 04341326 | A | 11/1992 |
| JP | 057740 | A | 1/1993 |
| JP | 2004275994 | A | 10/2004 |
| JP | 2004283651 | A | 10/2004 |
| WO | 2017204123 | A1 | 11/2017 |

* cited by examiner

SEPARATION MEMBRANE MODULE

CROSS REFERENCE TO RELATED APPLICATIONS

This is the U.S. National Phase application of PCT/JP2017/018916, filed May 19, 2017, which claims priority to Japanese Patent Application No. 2016-104084, filed May 25, 2016, the disclosures of each of these applications being incorporated herein by reference in their entireties for all purposes.

FIELD OF THE INVENTION

The present invention relates to a separation membrane module for separating a part of components in a fluid such as a liquid or a gas introduced into a module container by a separation membrane element having provided therein the module container.

BACKGROUND OF THE INVENTION

A separation membrane module is used in water treatment or gas separation applications which separates a part of components of a mixed fluid. In general, in the separation membrane module, a separation membrane element which is an assembly of a plurality of single separation membranes is housed in a module container. The single separation membrane used in the separation membrane element has various shapes such as a linear shape and a planar shape, and the separation membrane element using a linear single separation membrane is formed such that both end portions of the separation membrane are fixed by membrane bundle fixing materials and both end surfaces of the separation membrane are open to an outside of the membrane bundle fixing material.

For example, in a separation membrane module of Patent Document 1, a hollow-fiber membrane (one type of linear single separation membranes) of a separation membrane element is disposed in a U-shape, and both ends of a membrane bundle thereof are sealed and fixed by a resin wall (an adhesive). Separation is achieved by increasing a pressure of a mixed fluid on an outer diameter side of the hollow-fiber membrane bundle.

When such a separation membrane module is used in a water treatment application for seawater desalination or a gas separation application for separating impurities such as carbon dioxide from natural gas, in order to obtain sufficient membrane separation performance, sometimes the separation membrane module is operated while applying a very high pressure to inside the module.

When the high pressure is applied to the separation membrane module, a very large pressure difference occurs between a portion where the mixed fluid before permeating the separation membrane is present and a portion where permeated components after permeating the separation membrane is present. That is, in the separation membrane module using an external pressure type separation membrane in which the fluid passes from an outer diameter side to an inner diameter side of the hollow-fiber membrane bundle, a part of the components of the mixed fluid permeates into an inner side of the hollow-fiber membrane, and flows from the inner side toward both end opening portions of the hollow-fiber membrane, and hence a force which makes a membrane bundle fixing material having an opening surface of the separation membrane spread out toward both end surfaces of the hollow-fiber membrane is generated. Consequently, the membrane bundle fixing material may sometimes be separated from a module container or the hollow-fiber membrane, or the membrane bundle fixing material may be sometimes broken and the airtightness of the hollow-fiber membrane bundle and the module container may not be ensured. Patent Document 1 describes that a pressure receiving plate is disposed adjacent to the membrane bundle fixing material in order to prevent such deformation of the membrane bundle fixing material.

PATENT DOCUMENTS

Patent Document 1: JP-A-54-122678

SUMMARY OF THE INVENTION

In separation membrane type fluid separation, pressure loss occurs not only when the fluid passes through a separation layer of the separation membrane, but also when the separated fluid passes through inside the separation membrane. Therefore, when it is necessary to separate a large amount of fluid, even if a length of the separation membrane (a hollow-fiber length) is simply lengthened in order to increase an effective area of the separation membrane in the separation membrane module as described in Patent Document 1, the pressure loss inside the hollow-fiber membrane increases, and hence there is a problem that sufficient separation performance cannot be obtained.

An object of the present invention is to provide a separation membrane module capable of realizing high membrane separation efficiency by preventing deformation of a membrane bundle fixing material and reducing an effect of pressure loss even when a large amount of fluid is processed under high pressure.

In order to solve the above problems, present invention includes the following.

(1) A separation membrane module including: a hollow module container; and an element unit which is housed in the module container, in which the element unit includes a plurality of separation membrane elements which are connected to each other, the separation membrane elements including a separation membrane for separating components of a substance flowing into an inside of the module container, and a membrane bundle fixing material for fixing both ends of the separation membrane, and a flow channel for discharging the components separated by the separation membrane to outside of the element unit is formed in the element unit, and in which passage members through which the components separated by the separation membranes can pass toward the flow channel for discharging the components are disposed at connections between the plurality of separation membrane elements such that both end surfaces of each of the passage members are respectively in contact with the membrane bundle fixing materials of the separation membrane elements adjacent thereto.

(2) The separation membrane module according to (1), in which the passage member is formed of a single member.

(3) The separation membrane module according to (1) or (2), in which the passage member is formed of a porous member having fluid permeability.

(4) The separation membrane module according to any one of (1) to (3), in which the separation membrane element includes a case for housing the separation membrane, wherein in the case, a plurality of pores are formed to allow the substance to flow in, and a separated component flow channel member for passing the components which are separated by and permeate through the separation membrane, and in which both ends of each of the case, the separation membrane, and the separated component flow channel member are fixed by the membrane bundle fixing material.

(5) The separation membrane module according to any one of (1) to (4), in which the separation membrane is formed of a solid-fiber and an outer side of a cross section of the separation membrane is a separation layer and an inner side of the cross section has a continuous porous structure.

(6) The separation membrane module according to any one of (1) to (5), in which an end surface member constituting a part of the flow channel is disposed between the separation membrane element and the module container and an end surface passage member through which the components separated by the separation membrane can pass toward the flow channel for discharging the components is arranged, such that both end surfaces of the end surface passage member are respectively in contact with the membrane bundle fixing material and the end surface member.

According to the present invention, it is possible to provide the separation membrane module capable of realizing high membrane separation efficiency by preventing deformation of the membrane bundle fixing material, and reducing the pressure loss even when a large amount of fluid is processed under high pressure.

DETAILED DESCRIPTION OF EMBODIMENTS OF THE INVENTION

The embodiment of the present invention will be described below with reference to the drawings.

Figure 1:
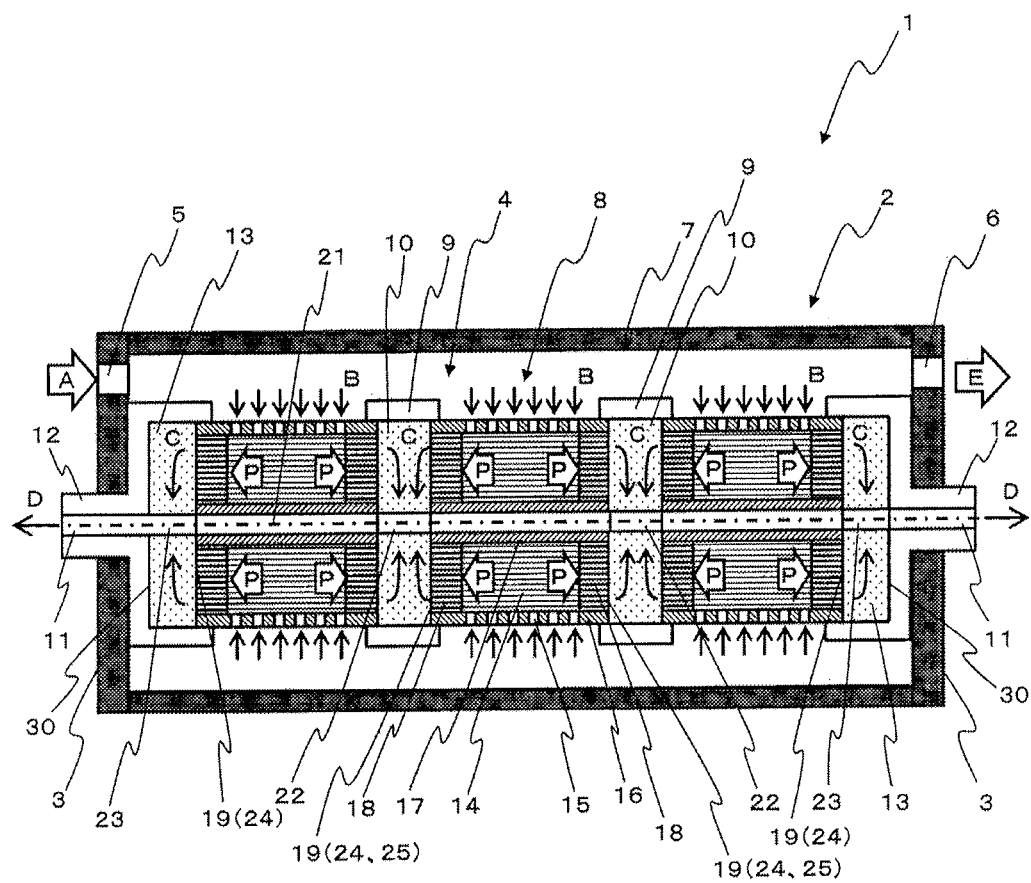
FIG. 1 is a schematic cross-sectional view illustrating an embodiment of the separation membrane module 1 of the present invention.
Figure 1:
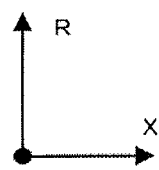

FIG. 1 is a schematic cross-sectional view illustrating a separation membrane module 1 according to an embodiment of the present invention.

Referring to FIG. 1, the separation membrane module 1 includes a module container 2 which has a cylindrical shape and whose cylindrical axial direction extends in the X direction, and an element unit 4 which includes three separation membrane elements 8 connected to each other, the elements being housed in the module container 2 and fixed to both end surfaces 3 of the module container 2.

The module container 2 may have any shape as long as it has a hollow shape, but a cylindrical shape is especially preferred because its connectivity to a plant line is good and even when high pressure is applied to the separation membrane module 1, the pressure is uniformly applied so that the stress is dispersed and stress concentration or the like to a part of the module container 2 hardly occurs.

For the material of the module container 2, an optimum material such as a resin or a metal may be selected according to the application of the separation membrane module 1, or it may be the one made by winding a glass fiber or a carbon fiber around a material such as a resin or a metal to further improve pressure resistance of the module container 2.

The size of the module container 2 is not particularly limited, and can be appropriately set according to the size of the separation membrane module 1 in a length direction (an X direction) and in a radial direction (an R direction), but in order to balance handleability in a plant and a container cost, a range of 1000 mm to 3500 mm in the length direction and a range of 100 mm to 500 mm in the radial direction are preferred.

Further, in FIG. 1, although one inflow port 5 into which a fluid such as a liquid or a gas flows and one outflow port 6 from which the fluid flows are provided on the end surfaces 3 of the module container 2 respectively, the number and the size of the inflow port 5 and the outflow port 6 are not limited, and the opening position is not limited to the end surfaces 3 of the module container 2 and may be provided on a side surface 7 of the module container 2.

The element unit 4 constituting the separation membrane module 1 includes a plurality of separation membrane elements 8, connecting members 9 for connecting the separation membrane elements 8 in the length direction (the X direction) of the separation membrane module 1, passage members 10 sandwiched between two separation membrane elements 8 at each connection portion, end surface members 12 forming end portions of the element unit 4 and having opening portions 11 communicating with an outside of the module container 2, and end surface passage members 13, each being sandwiched between the separation membrane element 8 positioned at both end portions of the element unit 4 and the end surface member 12.

The separation membrane element 8 includes a separation membrane 14 for separating a part of components of the flowing-in mixed fluid, case 16 for housing the separation membrane 14, a separated component flow channel member 17 serving as a part of a flow channel for discharging separated components separated by the separation membrane element 8 to an outside of the element unit 4, and membrane bundle fixing materials 18 for sealing and fixing both ends of the separation membrane 14, the case 16 and the separated component flow channel member 17. In the separation membrane element 8, holes 15 for allowing a substance to flow from the outer side to the inner side thereof toward separation membrane 14 are formed.

Both ends of the separation membrane 14 are sealed and fixed to the cases 16 and the separated component flow channel member 17 by the membrane bundle fixing materials 18, but an end surface 19 of the separation membrane 14 is configured of being exposed from the membrane bundle fixing material 18 and opening to the outside. Therefore, the separated component passed through a surface of the separation membrane 14 can go through an inside of the separation membrane 14 and flow from the end surface 19 of the separation membrane 14 to the outside. That is, in the element unit 4, a flow channel for discharging the separated component separated by the separation membrane element 8 to the outside of the element unit 4 is formed.

Here, the separation membrane elements 8, the connecting member 9, and the end surface members 12 constituting the element unit 4 are fixed so as to maintain airtightness. As a fixing method, any methods in which a screw portion is provided to each connecting portion so as to be fastened and fixed, or an adhesive is applied to each connecting portion so as to be bonded and fixed are available, but a detachable configuration is preferable such that a part of the plurality of separation membrane elements 8 to be provided in the element unit 4 can be easily replaced.

Figure 2:
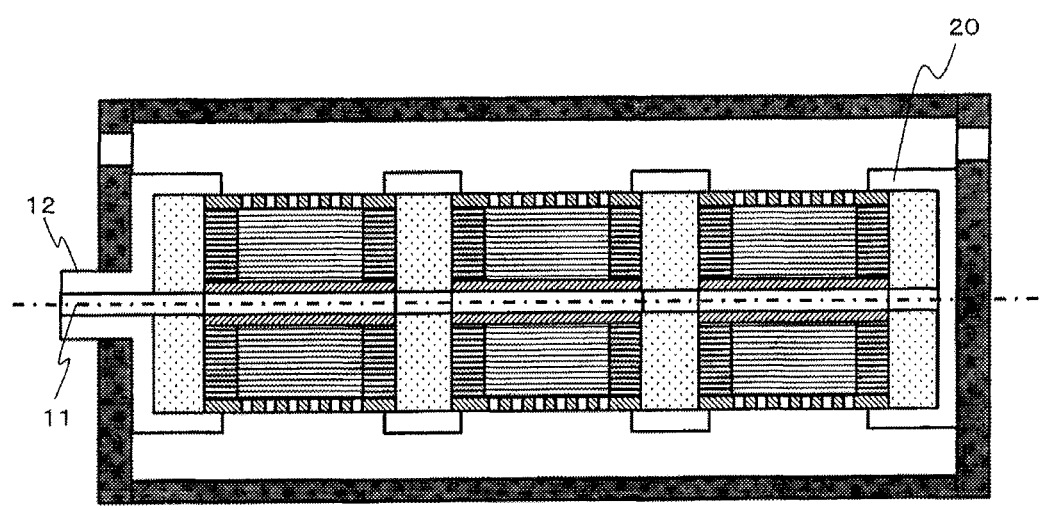
FIG. 2 is a schematic cross-sectional view illustrating a form of another separation membrane module of the present invention.
Figure 2:
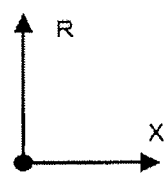

Although the element unit 4 shown in FIG. 1 includes the end surface members 12 including the opening portions 11 at both ends thereof, it is sufficient for only one position to communicate with the outside of the module container 2, for example, as shown in FIG. 2, and hence the element unit 4 may be configured to include the end surface member 12 including the opening portion 11 at one portion and an end surface member 20 having no opening portion at the other portion.

Returning to FIG. 1, the element unit 4 is disposed such that the cylindrical axial direction (the X direction) of the module container 2 coincides with a direction of a center axis 21 of the element unit 4, and the opening portion 11 of the end surface member 12 protrudes to the outside from a hole formed in a center of the end surface 3 of the module container 2.

Note that, even when a part of a member constituting the element unit 4 (the opening portions 11 of the end surface members 12 in the present embodiment) is exposed to the outside of the module container 2, in a case where the separation membrane element portion in the element unit 4 is present in the hollow of the module container 2, it is expressed in this specification that the element unit is housed in the module container.

A disposition direction of the element unit 4 is not limited, and, for example, although not shown, the element unit 4 may be disposed such that the radial direction (the R direction) of the module container 2 coincides with the direction of the center axis 21 of the element unit 4 and the element unit 4 may be configured to communicate with the outside via the side surface 7 of the module container 2. Further, there is no limitation to the method of fixing the module container 2 and the element unit 4 as long as the airtightness is ensured, for example, a screw portion may be provide to the module container 2 and the end surface member 12 so as to be fastened and fixed.

The separated component flow channel member 17 constituting the separation membrane element 8 is preferably a hollow pipe, but any flow channel member may be used as long as a flow channel through which the separated component can pass is included.

In the case 16, the hole 15 is formed to allow the substance to flow into the separation membrane 14. And it is preferable that a plurality of holes 15 are opened in a portion which is in contact with the separation membrane 14 in order to facilitate the flow of the substance into the separation membrane 14 and improve the separation efficiency.

Here, if the thickness of the case 16 is too thin, the rigidity of the case 16 decreases and the strength of the separation membrane element 8 decreases, and depending on the number of connected separation membrane elements 8, the length of the element unit 4, and the rigidity of the separated component flow channel member 17, there are cases where the element unit 4 is deflected in the gravitational direction and the element unit 4 is deformed to deteriorate the mountability to the module container 2 or if the deformation is too great, a crack occurs in a part of the case 16, and the element unit 4 is broken. Therefore, the thickness of the case 16 is preferably 0.5 mm or more.

The materials of the case 16, the separated component flow channel member 17, the connecting member 9, and the end surface member 12 are not particularly limited, and a most suitable material such as a resin and a metal may be selected according to the application of the separation membrane module 1.

The material of the membrane bundle fixing material 18 is not particularly limited, and any materials can be used, as long as the case 16, the separated component flow channel member 17, and the separation film 14 can be sealed and fixed. A resin-based adhesive such as an epoxy resin, a polyurethane resin, or a silicone resin is suitably used, and an epoxy resin excellent in compression strength, dimensional stability and durability is preferably used.

For the filtration method of the separation membrane 14 used in the present invention, a filtration method in which a part of the components of the substance permeates from the outside to the inside of the separation membrane 14 is preferred. For the separation membrane 14 of the present invention, it is particularly preferably the one formed by bundling a plurality of linear single separation membranes. The cross-sectional shape of the single separation membrane may be any, such as a circle, an ellipse, a polygon including a triangle or a tetragon, or the like.

For a more detailed cross-sectional structure, for example, a hollow-fiber shape where separation of substances is performed by a separation layer formed on an outer side of the single separation membrane unit, and a separated component can flow on the inner side of the single hollow separation membrane, for example, or a solid fiber shape where the density on the outer side of the single separation membrane is "fine", and the density on the inner side of the single separation membrane is "coarse", or where the structure of the outer side and the inner side are different, and the outer side is a dense separation layer, and the inner side is a continuous porous structure, thereby, separation of substance being performed on the outer side and separated components flowing on the inner side, is preferable.

In the present specification, an assembly such as a hollow-fiber membrane bundle is referred to as a "separation membrane", and a single body such as a hollow-fiber membrane is referred to as a "single separation membrane".

The material of the separation membrane 14 (a single separation membrane) may be either the one made of a single material or the one made of a plurality of materials. The material is not particularly limited as long as the material satisfies mechanical durability such as heat resistance and pressure resistance, chemical durability or the like depending on an application. Examples of the single hollow-fiber separation membrane include fluororesin such as polytetrafluoroethylene, polyvinylidene fluoride, ethylene tetrafluoride/propylene hexafluoride copolymer or the like, cellulose esters such as cellulose acetate and cellulose acetate propionate, and polysulfone resins such as polysulfone. In addition, examples of the solid-fiber single separation membrane include an inorganic film using an inorganic material such as zeolite, silica, and carbon fiber.

An outer diameter of the single separation membrane is preferably, for example, 0.05 mm to 2 mm. In particular, the present invention is suitably used for a separation membrane having a high pressure loss which occurs when the separated component passes through the inside of the separation membrane 14, and hence, it is more preferred that the single separation membrane has a small outer diameter of 0.05 mm to 1.2 mm, and it is particularly preferred that the single separation membrane is a solid-fiber single separation membrane in which pressure loss tends to become high when the separated component is passing through the inside of the separation membrane 14.

In the case where the separation membrane having a high pressure loss when the separated component is passing through the inside thereof is used or the viscosity of the separated components is high, the pressure loss caused by the separated component's passing through the inside of the separation membrane 14 increases, and consequently the membrane separation capability required for the separation membrane module 1 may not be obtained. In attempting to increase the membrane separation capability, the membrane length (the length in the X direction) of the separation membrane 14 of one separation membrane element 8 is lengthened. But the pressure loss caused by the separated component's passing through the inside of the separation membrane 14 goes on increasing.

Accordingly, in the present embodiment, three separation membrane elements 8 are connected to constitute the element unit 4. Here, the number of separation membrane elements 8 constituting one element unit 4 is not limited as long as the separation membrane elements 8 are housed in the module container 2. The larger the number of the separation membrane elements 8, the smaller the effect of the pressure loss in the entire element unit is made and high separation efficiency can be obtained.

Next, the flow of the substance flowing into the separation membrane module 1 will be described in detail with reference to FIG. 1.

The inflow port 5 and the outflow port 6 of the separation membrane module 1 are connected to, for example, a plant line (not shown), respectively. When a mixed fluid such as a mixed liquid or a mixed gas (not shown) flows into the inside of the module container 2 from the inflow port 5 as indicated by the arrow A, the flowing-in mixed fluid passes through the hole 15 of the case 16 of the separation membrane element 8 as indicated by the arrow B and contacts to the separation membrane 14, and hence, a part of the components permeates into the inside of the separation membrane 14.

Next, the separated components which has permeated into the inside of the separation membrane 14 flows through the inside thereof to both ends of the separation membrane 14, and flows out from the opening in the end surface 19 of the separation membrane 14. Then, the flowing-out separated components pass through the inside of the passage member 10 and the end surface passage member 13 as indicated by the arrow C, and pass through a flow channel (a path for discharging the separated components to the outside of the element unit 4) formed by the center hole 22 of the passage member 10, the separated component flow channel members 17, the center hole 23 of the end surface passage member 13, and the opening portion 11 of the end surface member 12. Then, the separated components flow from the opening portions 11 of the end surface members 12 provided at both end portions of the element unit 4 to the outside of the separation membrane module 1 as indicated by the arrow D. Meanwhile, the remaining components which are not separated by the separation membrane element 8 are discharged from the separation membrane module 1 as indicated by the arrow E.

When the separation membrane module 1 is used, for example, in a water treatment application for seawater desalination or a gas separation application, a very high pressure of, for example, 5 MPa or higher may be applied to the separation membrane 14, that is, the inside of the separation membrane module 1 in order to obtain desired separation performance.

When the high pressure is applied to the hollow inside of the separation membrane module 1, a large pressure difference occurs between a portion where the fluid to be permeated is present and a portion where the permeated fluid is present. In particular, a large pressure is applied to the membrane bundle fixing material 18 in the direction of the arrow P. Therefore, if the end surface 24 of the membrane bundle fixing material 18 has no support, the membrane bundle fixing material 18 is peeled from the separation membrane 14, the case 16, or the separated component flow channel members 17, or the membrane bundle fixing material 18 is damaged. Accordingly, the passage member 10 is disposed so as to be in contact with the end surface 24 of the membrane bundle fixing material 18.

Figure 3:
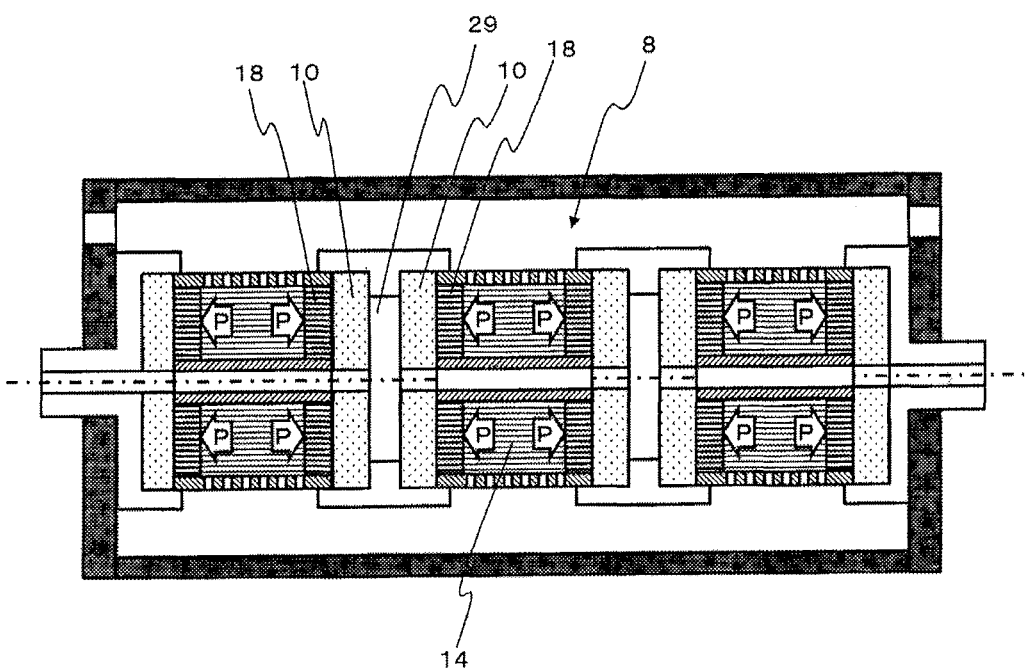
FIG. 3 is a schematic cross-sectional view illustrating a form of a separation membrane module different from the present invention.
Figure 3:
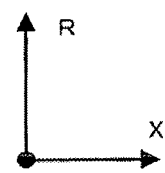

Here, as shown in FIG. 3, even if two passage members 10 are disposed at each connecting position of the separation membrane element 8, if there is a space 29 between the two passage members 10, each passage member 10 receives a large pressure in the direction of the arrow P from the side of the membrane bundle fixing material 18 adjacent only to one surface thereof. Therefore, in order to prevent the deformation of the membrane bundle fixing material 18, it is necessary to increase the thickness of the passage member 10 to ensure rigidity. Accordingly, in the present embodiment, as shown in FIG. 1, the passage member 10 is disposed so that both end surfaces of the passage member 10 are in contact with the adjacent membrane bundle fixing materials 18 of the separation membrane elements 8.

Figure 4:
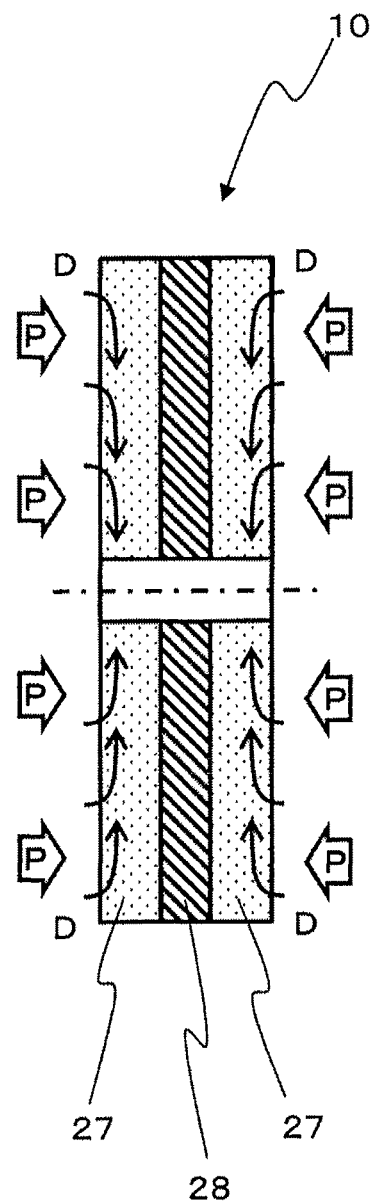
FIG. 4 is a schematic cross-sectional view illustrating an example of a passage member 10.

The passage member 10 may be formed of a single member or a plurality of members. The one formed of the plurality of members may be, for example, as shown in FIG. 4, a configuration in which two single surface passage members 27 having fluid permeability are in contact with an intermediate material 28 sandwiched therebetween. In this configuration, the separated components flow in the direction indicated by the arrow D. Further, the membrane bundle fixing material 18 comes into contact with only one surface of each single surface passage member 27, and the intermediate material 28 can receive the force applied from a side of each membrane bundle fixing material 18 in the direction of the arrow P. However, since the cost increases as the number of parts increases, the passage member 10 is preferably formed of a single member as shown in FIG. 1.

The thickness of the passage member 10 is not particularly limited, but it is preferably 3 mm or more, and more preferably 5 mm or more from the viewpoint of maintenance of strength.

Meanwhile, the thickness thereof is preferably 30 mm or less, more suitably 10 mm or less from the viewpoint of weight, cost, and space. If the thickness of the passage member 10 increases, in the case where the length of the separation membrane module is restricted by design, the separation performance will be deteriorated because the length of the separation membrane 14 is sacrificed by the thickness×the number of passage members 10.

The material of the passage member 10 is not particularly limited as long as the compressive strength which can maintain the shape thereof even under a double-surface compressive load is ensured.

The passage member 10 may be any form as long as the permeated fluid can pass through toward a flow channel for discharging the fluid to the outside of the element unit 4. For example, grooving (not shown) can be conducted on the end surfaces 25 on both sides of the passage member 10, and a groove portion can be used as the flow channel.

It is also preferred to use a porous member having fluid permeability for the passage member 10. When such a porous body is used, the separated components can freely pass through in any direction, such as the length direction (the X direction) or the radial direction (the R direction) of the passage member 10 inside the passage member 10, and hence, the separated components can pass through easily. In addition, numerous fine pores are open and thus the flow channel of the separated components are hardly blocked. Further, even if the center hole 22 of the passage member 10 as shown in FIG. 1 is not provided, the separated components can be discharged to the outside through the fine pores. That is, an imaginary route formed by the porous void portion and connecting the separated component flow channel members 17 serves as a flow channel for discharging the separated components to the outside of the element unit 4.

As such a porous member, for example, a sintered metal or a ceramic can be used. As the material of the sintered metal, stainless steel, copper, aluminum, or titanium may be used, but stainless steel which is excellent in mechanical strength, corrosion resistance, and cost is more preferably used. The filtration accuracy of the porous member used as the passage member 10 may be appropriately selected depending on the application, but is preferably in the range of 1 μm to 120 μm.

As shown in FIG. 1, for the similar reason as the passage member 10 of the connecting portion, the end surface passage member 13 sandwiched between the separation membrane element 8 positioned at both end portions of the element unit 4 and the end surface member 12 is preferably disposed in contacts with the end surface 24 of the membrane bundle fixing material 18 and the inner surface 30 of the end surface member 12.

Similar to the passage member 10, the end surface passage member 13 may have any shape or material as long as the compression strength which can maintain the shape under the compressive load is ensured and the separated components can pass therethrough. The shape and the material of the end surface passage member 13 may not be the same as those of the passage member 10, but the cost of the separation membrane module 1 can be reduced by using the same member because the members can be shared. Therefore, it is preferable to use the end surface passage member 13 having the same material and structure as the above described passage member 10.

Although the present invention has been described in detail with reference to particular embodiments, it will be apparent to those skilled in the art that various changes and modifications can be made without departing from the spirit and scope of the present invention. The present application is based on a Japanese Patent Application (JP2016-104084) filed on May 25, 2016, contents of which are incorporated herein by reference.

DESCRIPTION OF REFERENCE NUMERALS AND SIGNS 1 separation membrane module
2 module container
3 end surface of module container
4 element unit
5 inflow port
6 outflow port
7 side surface of module container
8 separation membrane element
9 connecting member
10 passage member
11 opening portion
12 end surface member
13 end surface passage member
14 separation membrane
15 hole
16 case
17 separated component flow channel member
18 membrane bundle fixing material
19 end surface of separation membrane
20 end surface member without opening portion
21 center axis of element unit
22 center hole of passage member
23 center hole of end surface passage member
24 end surface of membrane bundle fixing material
25 end surface of passage member
27 single surface passage member
28 intermediate material
29 space
30 inner surface of end surface member

The invention claimed is:

1. A separation membrane module comprising: a hollow module container; and an element unit which is housed in the module container,
    wherein the element unit comprises a plurality of separation membrane elements which are connected to each other, the separation membrane elements including a separation membrane for separating components of a substance flowing into an inside of the module container, and a membrane bundle fixing material for fixing both ends of the separation membrane, and a flow channel for discharging the components separated by the separation membrane to outside of the element unit is formed in the element unit, and
    wherein passage members through which the components separated by the separation membranes can pass toward the flow channel for discharging the components are disposed at connections between the plurality of separation membrane elements such that both end surfaces of each of the passage members are respectively in direct contact with the membrane bundle fixing materials of the separation membrane elements adjacent thereto,
    wherein the passage member is formed of a single member.

2. The separation membrane module according to claim 1, wherein the separation membrane element includes
    a case for housing the separation membrane, wherein in the case, a plurality of pores are formed to allow the substance to flow in, and
    a separated component flow channel member for passing the components which are separated by and permeate through the separation membrane, and
    wherein both ends of each of the case, the separation membrane, and the separated component flow channel member are fixed by the membrane bundle fixing material.

3. The separation membrane module according to claim 1, wherein an end surface member constituting a part of the flow channel is disposed between the separation membrane element and the module container and an end surface passage member through which the components separated by the separation membrane can pass toward the flow channel for discharging the components is arranged, such that both end surfaces of the end surface passage member are respectively in contact with the membrane bundle fixing material and the end surface member.

4. The separation membrane module according to claim 1, wherein a thickness of the passage member is 3 mm or more and 30 mm or less.

5. A separation membrane module comprising: a hollow module container; and an element unit which is housed in the module container,
  wherein the element unit comprises a plurality of separation membrane elements which are connected to each other, the separation membrane elements including a separation membrane for separating components of a substance flowing into an inside of the module container, and a membrane bundle fixing material for fixing both ends of the separation membrane, and a flow channel for discharging the components separated by the separation membrane to outside of the element unit is formed in the element unit,
  wherein passage members through which the components separated by the separation membranes can pass toward the flow channel for discharging the components are disposed at connections between the plurality of separation membrane elements such that both end surfaces of each of the passage members are respectively in contact with the membrane bundle fixing materials of the separation membrane elements adjacent thereto,
  wherein the passage member is formed of a single member, and
  wherein the passage member is formed of a porous member having fluid permeability.

* * * * *